US006642475B2

(12) United States Patent
Benderly

(10) Patent No.: US 6,642,475 B2
(45) Date of Patent: Nov. 4, 2003

(54) ETCHED ARTICLE AND METHOD OF ETCHING

(76) Inventor: David Benderly, 575 Main St., New York, NY (US) 10044

( * ) Notice: Subject to any disclaimer, the term of this patent is extended or adjusted under 35 U.S.C. 154(b) by 38 days.

(21) Appl. No.: 09/948,246

(22) Filed: Sep. 7, 2001

(65) Prior Publication Data

US 2003/0024908 A1 Feb. 6, 2003

Related U.S. Application Data

(60) Provisional application No. 60/231,022, filed on Sep. 8, 2000.

(51) Int. Cl.[7] ........ B23K 26/00

(52) U.S. Cl. ........ 219/121.68; 219/121.69

(58) Field of Search ........ 219/121.6, 121.68, 219/121.69, 121.82, 121.85, 1

(56) References Cited

U.S. PATENT DOCUMENTS 4,332,872 A * 6/1982 Zingher

FOREIGN PATENT DOCUMENTS

JP 01214480 A * 8/1989

* cited by examiner

*Primary Examiner*—Samuel M. Heinrich

(74) *Attorney, Agent, or Firm*—Kirschstein, et al.

(57) ABSTRACT

A substrate is marked by applying a high melting point material over a lower surface of the substrate, and then heating the material layer. Indicia are formed by directing a source of radiant energy through the substrate for impingement on the material layer, and by moving the source and/or the substrate relative to each other.

16 Claims, 1 Drawing Sheet

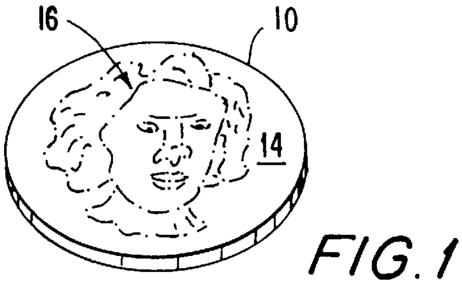
FIG. 1
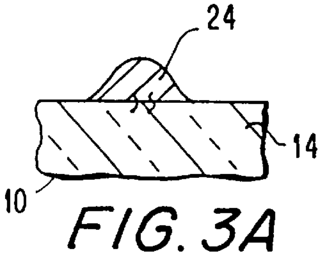
FIG. 3A
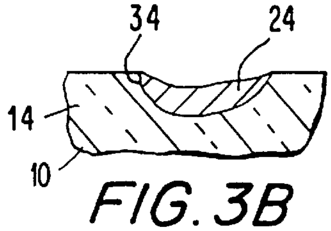
FIG. 3B
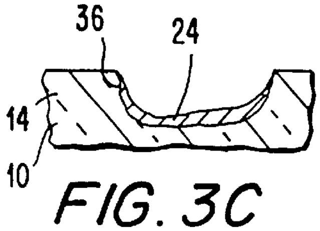
FIG. 3C
FIG. 2
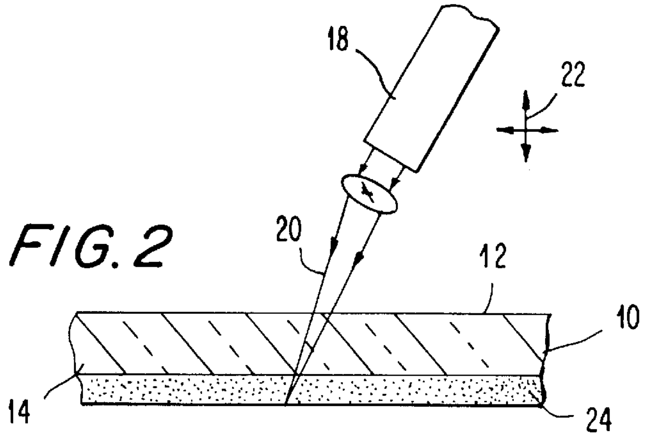

ETCHED ARTICLE AND METHOD OF ETCHING

CROSS REFERENCE TO RELATED APPLICATION

This application claims the benefit of U.S. provisional Application Serial No. 60/231,022, filed Sep. 8, 2000.

BACKGROUND OF THE INVENTION

1. Field of the Invention

The present invention generally relates to etched articles and, more particularly, to methods of etching articles.

2. Description of the Related Art

It is known to etch or inscribe a diamond surface by aiming a laser beam directly at the diamond surface, and by moving the laser beam and the diamond surface relative to each other to create a desired etched pattern. See, for example, U.S. Pat. No. 4,392,476 and U.S. patent application Ser. No. 09/785,631, filed Feb. 16, 2001.

It is also known to create ornamental articles of jewelry by directing a laser beam through a light-transmissive cover for impingement on a precious metal substrate, such as a gold foil or disc, and by moving the laser beam and the substrate relative to each other to create a desired etched pattern. See, for example, U.S. Pat. No. 5,609,043 and U.S. Pat. No. 5,799,511.

It is further known from U.S. patent application Ser. No. 09/909,174, filed Jul. 19, 2001, to apply a high melting point material over a diamond surface, and to heat the material to create a desired etched pattern on a gemstone. The pattern can be formed by a stencil, or by moving a source of radiant energy such as a laser relative to the diamond surface.

All these techniques involve the direct etching of articles of considerable worth, i.e., diamonds and gold substrates. Etching errors are costly. Burn holes through the substrates or burn marks in undesired placed on the diamonds or substrates detract from the overall aesthetic appeal.

SUMMARY OF THE INVENTION

Object of the Invention

It is an object of this invention to create an etched article of high quality and of inexpensive manufacture, especially a decorative article suitable for use as jewelry.

Features of the Invention

In keeping with this object, one feature of this invention resides in a substrate marking system and method that apply a fusible coating of a high melting point material on a lower surface of the substrate, for example, a transparent disc. The coating is applied over the entire surface of the disc. A high melting point substance or mixture having a melting point greater than that of the substrate is used for the coating. The substance or mixture is exposed to an energy source and heated to heat the surface in a marking pattern. The energy source, preferably a laser, emits a laser beam and directs the laser beam and/or the substrate to move relative to each other along the marking pattern. The laser beam passes through the substrate. The coating may be applied in any thickness since the marking is not dependent on the thickness of the coating.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of an etched article made in accordance with this invention;

FIG. 2 is a part-sectional view of the article of FIG. 1 during manufacture; and FIGS. 3A, 3B and 3C are sectional, enlarged views of marked areas of the article.

DETAILED DESCRIPTION OF THE PREFERRED EMBODIMENTS

Reference numeral 10 in the drawings depicts a light-transmissive substrate, such as glass, quartz, fused silica, or plastic, having an upper surface 12 facing a laser 18 that emits a laser beam 20, and an opposite lower surface 14 on which a mark 16 is etched. The mark 16 is depicted as an image of a person and is especially desirable when the substrate is to be incorporated into an article of jewelry, for example, a pendant or a pin. However, the mark can be any human-readable indicium such as an alphabetical and/or numerical indicium, or any machine-readable indicium such as a one- or a two-dimensional bar code symbol, or can be any logo or image such as a certification mark of quality or source of origin.

The substrate 10 is generally planar and, as shown, is a circular disc. Other shapes are contemplated for the substrate.

The mark 16 is formed as follows:

A layer 24 of a high melting point substance or mixture having a melting point exceeding that of the substrate, e.g., glass, is applied over the lower surface 14 of the substrate. Preferably, the high melting point material is tungsten, or a ceramic, or an alloy of such materials. The material layer may be sprayed, painted, dusted, or otherwise applied over the substrate.

Thereupon, as shown in FIG. 2, the laser beam 20 and/or the substrate can be moved in the directions of the four-headed arrows 22 to directly trace a desired pattern of the mark on the lower surface 14. The beam 20 is focused by a focusing lens 26 on the material layer 24. The light-transmissive substrate simply allows the emitted laser beam 20 to pass therethrough. The material layer 24 is heated at each point of impingement and alters the lower surface in dependence upon the energy level of the laser beam.

At a relatively low energy level as depicted in FIG. 3A, the material layer 24 forms a raised bump and is fused to the lower surface 14 which may have cracks or fractures under the bump. A gel may be applied over the bump to help secure its position. At a medium energy level as depicted in FIG. 3B, the heat is so intense that a cavity 34 is formed in the lower surface, and the material layer 24 flows into and substantially fills the cavity until its upper surface is generally flush with the outer surface of the lower Slav surface. At the highest energy level as depicted in FIG. 3C, a much larger cavity or crater 36 is formed by the heat from the focused laser beam 20, and the material layer 24 flows into and substantially lines or coats the interior surface of the crater. In all cases, the material layer 24 has a marking pattern which matches the shape of the identifying indicia or mark 16 desired.

The radiant energy source is preferably a laser, such as an excimer laser, but can be any type of laser or even a radio frequency or microwave source of radiation.

When tungsten is used for the material layer, the material layer 24 turns black after exposure to the radiation. The black or dark-colored layer 24 presents a sharp contrast against the essentially colorless substrate. Other colors are obtainable when ceramic materials are used for the material layer.

Once the substrate is marked, a final heating step by baking the substrate in an oven, or by exposing the substrate to a finishing laser, may be needed.

The next step is to clean the substrate, preferably in a water, or an acetone or acid wash.

The cleaned substrate may now be incorporated into an article of jewelry. For example, it can be inserted into a split ring and worn as a pendant.

The movement or steering of the laser beam is preferably accomplished by steering mirrors under computer control. A photograph of an image can be electronically scanned, and the coordinates of each pixel of the image stored and retrieved to direct the steering of the mirrors. Since the etched image is formed on the lower surface of the substrate, a reversed version of the image is used for steering control.

It will be understood that each of the elements described above, or two or more together, also may find a useful application in other types of constructions differing from the types described above.

While the invention has been illustrated and described as embodied in an article of jewelry, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A radiant energy marking system for marking a light-transmissive substrate, comprising:

a) a fusible coating applied over a lower surface of the substrate and having a melting point exceeding that of the substrate, and b) a radiant energy source for directing radiant energy at an upper surface of the substrate, and through the substrate, in a pattern corresponding to indicia to be marked on the substrate, and for heating the coating to fuse the coating to the substrate to mark the indicia pattern on the lower surface of the substrate.

2. The system of claim 1, wherein the coating includes one of a metal material, a metal oxide material, a ceramic material, and an alloy of said materials.

3. The system of claim 1, wherein the substrate includes one of glass, quartz, fused silica and synthetic plastic material.

4. The system of claim 1, wherein the substrate is a transparent disc.

5. The system of claim 1; and further comprising a drive for moving the radiant energy source and the substrate relative to each other to trace the indicia pattern.

6. The system of claim 1, wherein the source is a laser.

7. The system of claim 1; and further comprising a controller for adjusting an output energy level of the radiant energy source among a low energy level in which the coating is fused and raised relative to the lower surface, a medium energy level in which the coating fills a crater formed in the lower surface and is generally flush with and fused to the lower surface, and a high energy level in which the coating lines the crater and is below and fused to the lower surface.

8. The system of claim 1, wherein the coating has a color contrasting with that of the substrate after exposure to the radiant energy.

9. A method of marking a light-transmissive substrate, comprising the steps of:

a) applying a fusible coating on and over a lower surface of the substrate; and b) exposing the coating to radiant energy by directing the radiant energy at an upper surface of the substrate, and through the substrate, in a pattern corresponding to indicia to be marked on the substrate, and heating the coating to fuse the coating to the substrate to mark the indicia pattern on the lower surface of the substrate.

10. The method of claim 9, wherein the applying step is performed by depositing one of a metal material, a metal oxide material, a ceramic material, and an alloy of said materials on the lower surface of the substrate.

11. The method of claim 9, wherein the applying step is performed by one of spraying, painting and dusting.

12. The method of claim 11, wherein the applying step is performed by depositing the coating as a uniform continuous layer.

13. The method of claim 9, wherein the exposing step is performed by energizing a laser.

14. The method of claim 9; and further comprising the step of adjusting an output energy level of the radiant energy among a low energy level in which the coating material is fused and raised relative to the lower surface, a medium energy level in which the coating material fills a crater formed in the lower surface and is generally flush with and fused to the lower surface, and a high energy level in which the coating material lines the crater and is below and fused to the lower surface.

15. The method of claim 9; and further comprising the step of moving a radiant energy source and the substrate relative to each other to trace the indicia pattern.

16. The method of claim 9; and further comprising the steps of heating and cleaning the substrate after marking has been completed.

* * * * *